Patented Aug. 24, 1943

2,327,422

UNITED STATES PATENT OFFICE 2,327,422

COMPOSITION OF MATTER AND METHOD AND STEPS OF MAKING AND USING THE SAME

Mortimer T. Harvey, East Orange, N. J., assignor to Harvel Research Corporation, a corporation of New Jersey No Drawing. Application March 30, 1940, Serial No. 327,057

13 Claims. (Cl. 260—42)

The present invention relates to compositions of matter in which solid vinyl polymers are dispersed in certain liquid condensation reaction products of formaldehyde and material of a group consisting of pinene, terpineol and tertiary alkyl alcohol, which said compositions of matter range in consistency from the liquid state to a solid, rubber-like resilient state.

Some of the condensation products of formaldehyde with pinene, terpineol and tertiary alkyl alcohol are described and claimed in my copending applications Serial Numbers 190,038, filed Feb. 11, 1938; 216,417, June 29, 1938; 243,123, Nov. 30, 1938; and 251,945, Jan. 20, 1939. Illustrative examples of these condensation reaction products and of the methods and steps of forming them are given below with certain identifying characteristics. Examples of formaldehyde condensation products used in the practice of the present invention and included herein and not described in the above identified copending applications are to be described and claimed in application to be filed.

*Example 1.*—Approximately two moles of formaldehyde and one mole of turpentine. Four hundred and sixty-two grams of turpentine, five hundred and ten grams of 40% formaldehyde solution, and four and one-half cubic centimeters of concentrated hydrochloric acid were heated together under a reflux condenser with continued stirring for about eight hours. The products separated into two layers and were (a) a light colored oil-like layer having a specific gravity of 0.933 and weighing 500 grams, and (b) a water layer having a specific gravity of 1.068 and weighing about 450 grams. The oil-like product is separated from the water layer and is suitable for the practice of the present invention. This oil-like product has a specific gravity of 0.933 and has a boiling range in which 50% boils off at 150° to 165° C., 25% off at 165° to 185° C., and the balance above 185 C.

*Example 2.*—About three moles of formaldehyde and one mole of turpentine. 462 grams of turpentine, 765 grams of a 40% solution of formaldehyde in water, and 7 c. c. of concentrated hydrochloric acid were heated together under a reflux condenser with continued stirring for about eight hours. The products separated into two layers and were (a) an oil-like layer having a specific gravity of 1.030 and weighing about 635 grams and (b) a water layer having a specific gravity of 1.044 and weighing about 560 grams. The oil-like product is separated from the water layer and is suitable for the practice of the present invention. This oil-like product has a specific gravity of 1.030 and has a boiling range in which 20% boils off at 150° to 165° C., 20% off at 165° to 185° C., and the balance above 185° C.

*Example 3.*—About four moles of formaldehyde and one mole of turpentine. Eighty (80) pounds of turpentine, one hundred sixty (160) pounds of a 40% solution of formaldehyde in water, and one and one tenth (1.1) pounds of concentrated sulphuric acid were heated under a reflux condenser with continued stirring for about eight hours. The oil-like layer had a specific gravity of 1.08 at 25° C. and a boiling range above about 165° C.

*Example 4.*—About five moles of formaldehyde and one mole of turpentine. About sixty-eight (68) pounds of turpentine, one hundred ninety (190) pounds of a 40% formaldehyde solution in water, and one and one half (1.5) pounds of concentrated sulphuric acid were heated under a reflux condenser with continued stirring for about ten hours. The oil-like layer was separated from the water layer.

The turpentine used in the above examples had a specific gravity of 0.865 at 75° F., had a distillation range from about 150° C. to about 180° C., and was almost colorless. It is considered in the examples above to contain about 75% pinene and the calculation for molecular proportions of turpentine to formaldehyde is made with this in view so that the examples above can be considered to be molecular proportions of pinene to the given molecular proportions of formaldehyde. And certain of the claims are directed to condensation of pinene with formaldehyde.

Small quantities of sulphuric acid can be used in place of the hydrochloric acid for the condensation of the turpentine and formaldehyde, if the quantity is kept below that with which substantial polymerization of the turpentine will take place. Concentrated sulphuric acid of about 1.83 specific gravity (about 66° Baumé) is suitable for the condensation reaction catalyst, but the reaction is not limited to this strength because sulphuric acid of various strengths above and below this are suitable, from dilute sulphuric acid up to oleum. In any case the sulphuric acid is diluted by the water of the CH₂O solution.

*Example 5.*—About one mole of steam distilled pine oil and three moles of formaldehyde (37% solution in water), as reagents, and concentrate hydrochloric acid in amount about five tenths of one per cent of the weight of the said reagents are heated under a reflux condenser for about three hours at which time the odor of formaldehyde has disappeared. The condensation product appears as a light colored liquid layer under the water which comes from the formaldehyde solution and which is formed during the condensation of the pine oil and formaldehyde. The specific gravity of this water insoluble liquid reaction product taken as a whole is 1.066 at 15° C., that of the pine oil used as reagent was 0.940. The yield was about ninety per cent of the theoretical yield for condensation of the pine oil and formaldehyde.

This liquid reaction product was washed free of acid and then distilled at 4 cm. of mercury and carried on until a temperature of about 200° C. was reached, about forty per cent coming over up to and at this temperature. The residue was clear, amber colored and had a specific gravity of about 1.09 to about 1.1 at 15° C.

*Example 6.*—Two moles of formaldehyde and one mole of tertiary butyl alcohol at atmospheric pressure.

|  | Grams |
|---|---|
| 40% water solution HCHO | 425 |
| Tertiary butyl alcohol | 185 |
| Sulphuric acid (conc.) | 61 |
| Water | 61 |

The above four materials in the amounts stated were dissolved together and refluxed for about six hours and then the reaction mass was neutralized. No formaldehyde was detected after the reaction. The reaction mass was then heated to about 250° F. to remove water and light volatiles and to leave a product which is oily in appearance and to the feel and had a specific gravity of 1.02.

*Example 7.*—Two moles of formaldehyde and one mole of tertiary butyl alcohol at a pressure of about one hundred pounds.

|  | Grams |
|---|---|
| 40% water soln. HCHO | 680 |
| Tertiary butyl alcohol | 300 |
| H₂SO₄ (conc.) | 10 |
| Water | 10 |

The above four materials, in the amounts stated, were dissolved together, placed in an autoclave and heated at a pressure of about one hundred pounds per square inch for about three hours, and the resulting reaction products neutralized and distilled to a vapor temperature of 250° F. The residue is an oil-like layer suitable for use in the practice of the present invention.

*Example 8.*—Three moles of formaldehyde and one mole of tertiary butyl alcohol, at atmospheric pressure.

|  | Grams |
|---|---|
| 40% water solution of HCHO | 765 |
| Tertiary butyl alcohol | 222 |
| H₂SO₄ (conc.) | 100 |
| Water | 100 |

The above four materials, in the stated amounts, were dissolved together and heated under a reflux condenser for about three hours, at which time all traces of formaldehyde had disappeared. The reaction mixture was neutralized with about eighty grams of sodium hydroxide, and distilled to a vapor temperature of about 250° F. The oil-like residue is suitable for use in the practice of the present invention.

*Example 9.*—Three moles of formaldehyde and one mole of tertiary butyl alcohol at atmospheric pressure.

|  | Grams |
|---|---|
| 40% water solution of HCHO | 255 |
| Tertiary butyl alcohol | 74 |
| HCl | 10 |

The three above materials, in the stated amounts, were heated under a reflux condenser for about six hours. After neutralizing, the reaction mixture was distilled to a vapor temperature of about 250° F. The residue is an oil-like product suitable for use in the practice of the present invention.

*Example 10.*—Three moles of formaldehyde and one mole of tertiary butyl alcohol at atmospheric pressure.

|  | Grams |
|---|---|
| 40% water solution of HCHO | 765 |
| Tertiary butyl alcohol | 222 |
| H₂SO₄ (conc.) | 50 |
| Water | 50 |

The above four materials, in the amounts stated, were heated under a reflux condenser for about six hours, at which time all traces of formaldehyde had disappeared. After neutralizing, the reaction mixture was distilled to a vapor temperature of about 250° F. The residue is an oil-like product suitable for use in the practice of the present invention.

*Example 11.*—Three moles of formaldehyde and one mole of tertiary butyl alcohol at about one hundred pounds pressure per square inch.

|  | Grams |
|---|---|
| 40% water solution of HCHO | 765 |
| Tertiary butyl alcohol | 222 |
| H₂SO₄ conc. | 2.5 |
| Water | 2.5 |

The above four materials, in the stated amounts, were heated under a reflux condenser for about three hours, neutralized and the reaction mixture was distilled to a vapor temperature of about 250° F. The residue is an oil-like product suitable for use in the practice of the present invention.

*Example 12.*—About four moles of formaldehyde and one mole of tertiary butyl alcohol. About eighty (80) pounds of formaldehyde (about 40% solution in water), eighteen (18) pounds of tertiary butyl alcohol, and sixty-six (66) cubic centimeters of concentrated sulphuric acid are heated in a closed container at a pressure of about 100 to 140 pounds for about two hours. The reaction mass was neutralized and then heated, in the open, to about 300° F. to remove water and lighter volatiles. The residue is an oil-like product suitable for use in the practice of the present invention.

*Example 13.*—About three moles of formaldehyde and one mole of tertiary amyl alcohol. About sixty three and one-half (63.5) pounds of a 37% solution of formaldehyde in water, twenty-four (24) pounds of tertiary amyl alcohol, and fifty-five (55) cubic centimeters of concentrated sulphuric acid are heated at about one hundred (100) pounds pressure for from one to two hours, after which the oil-like layer is removed from the water layer and dehydrated by heating to 300° F.

*General example.*—Various amounts or ratios of formaldehyde with or to the material selected from the group consisting of terpene, terpineol and tertiary alkyl alcohol can be used, from about two to about seven moles formaldehyde to one mole of the selected material to obtain the oil-like reaction products suitable for use in the practice of the present invention. These products are stable in the presence of acids, in contra-distinction from acetals which, in the presence of acids, break down into alcohols and aldehydes.

In the practice of the present invention, the oil-like reaction product of the selected material and formaldehyde, taken from Examples 1 to 13 or the general example above, is intermixed with a polymeric vinyl resin with the aid of heat to form a product which at higher temperatures is a liquid of comparatively thin consistency and which at normal temperatures and at temperatures up to about 200° F. is a resilient, rubberlike solid and in which the polymeric vinyl resin is in a state of suspension or solution or in a state of suspension and solution in the condensation product generally and particularly described above. In the above examples the materials selected are given as illustrations and are not intended to delimit the scope of the invention from the inclusion of materials which are equivalents of those given in the examples. Various tertiary alkyl alcohols can be used, generally, all those having from four to fourteen carbons atoms in the alkyl group attached to the hydroxyl group.

Illustrative examples of the compositions of the present invention are given as follows:

*Example A.*—Three parts by weight of the oil-like product of Example 13 above and one part of a copolymer of vinyl chloride and vinyl acetate, are mixed together and heated up to about 300° to 320° F. until the whole mixture liquefies and forms a clear, bubble-free mass. A copolymer of vinyl chloride and vinyl acetate suitable is one comprising originally a greater part of vinyl chloride and a lesser part of vinyl acetate and known and sold on the market as "Vinylite VYN W," and in the above mixture, on cooling, gives a resilient, rubber-like consistency, with a Shore hardness of 12 to 14.

*Example B.*—About four parts by weight of the oil-like product of Example 2, above, and one part of "Vinylite VYN W" are mixed together and heated up to 300° to 320° F. until the mixture liquefies and forms a clear, bubble-free mass. This product on cooling is of a resilient, rubber-like consistency and has a Shore hardness of about 12 to 14.

*Example C.*—About four parts by weight of the oil-like product of Example 4, above, and one part of "Vinylite VYN W" are mixed and heated as in Examples A and B, above.

*Example D.*—In the oil-like product of Example 2, above, about four parts of the oil-like product of Example 5, above, are substituted in the formula of Example B, above.

*Example E, general example.*—Polymerized vinyl chloride, polymerized vinyl acetate, or polyvinyl alcohol can be substituted for the "Vinylite VYN W" in Examples A, B, C and D, above.

*Example F, general example.*—The proportions of oil-like product of Examples 1 to 13, above, used with polymeric vinyl resin to make resilient, rubber-like products can be varied from about one part of oil-like product to one part of polymeric vinyl resin, to about twenty-five parts of oil-like product to one part of polymeric vinyl resin.

The products of the present invention are useful in the arts generally, and, more particularly, are useful in the printing arts for the transferring of ink, immediately or intermediately, from a source of ink to surfaces to be printed. For this purpose the products or composition of the present invention are suitable in the form of printing rolls and printing plates, for illustrative example. The compositions of the present invention are rubber-like and resilient and are suited for making contact with surfaces of other objects and recover their normal shape quickly after the release of any pressure such as might be used in the transfer of ink. Further the compositions of the present invention have the characteristics of being uniformly wetted by printing inks and of being substantially resistant to the solvent action of mineral oils and of standing up under continued contact with printing inks. Also the compositions of the present invention do not melt or soften at temperatures up to about 225° F. and some of them do not soften at temperatures as high as 275° F. Printing rolls and printing plates are made by pouring the compositions of the present invention into molds or onto matrices to form printing rolls or printing plates, which, when the poured compositions have cooled, have the desirable characteristics above described.

In the above Examples 1 to 4 and the general example, turpentine is disclosed as a convenient and useful form of terpene for condensation with formaldehyde, but pinene itself can be used, as can the equivalent unsaturated alicyclic compounds. In Example 5 pine oil is given as a useful form of terpineol. Also, in Examples 6 to 13, tertiary butyl alcohol and teritary amyl alcohol are given as illustrative examples of tertiary alkyl alcohols but others up to and including those having fourteen carbon atoms can be used.

Having thus described my invention, what I claim and desire to protect by Letters Patent is:

1. A composition of matter having a resilient rubber-like consistency and comprising a suspension of a copolymer of vinyl chloride and vinyl acetate in a liquid which is a condensation reaction product of formaldehyde and pinene, which said liquid is stable in the presence of mineral acids, has a boiling point above 200° C. and has a specific gravity in excess of 1.0 the proportions of said liquid to said copolymer being from about one part of said liquid to one part of said copolymer to about twenty-five parts of said liquid to one part of said copolymer.

2. In a composition of matter in which a normally hard, solid material is dispersed in a material which is normally liquid to form a rubber-like resilient jel, in combination, material selected from the group consisting of polymerized vinyl chloride, polymerized vinyl acetate and copolymers of vinyl chloride and vinyl acetate as the normally hard, solid material and material selected from the group consisting of condensation reaction products of formaldehyde and turpentine, formaldehyde and pine oil, formaldehyde and pinene and formaldehyde and terpineol as the normally liquid material, said selected normally liquid material having a boiling point above 200° C. and being stable in the presence of water solutions of mineral acids the proportions of said liquid material to said solid material being from about one part of said liquid material to one part of said solid material to about twenty-five parts of said liquid material to one part of said solid material.

3. In a composition of matter in which a normally hard, solid material is dispersed in a material which is normally liquid to form a rubber-like resilient jel, in combination, material selected from the group consisting of polymerized vinyl chloride, polymerized vinyl acetate, and copolymers of vinyl chloride and vinyl acetate as the normally hard, solid material and a condensation reaction product of formaldehyde and turpentine as the normally liquid material, said normally liquid material having a boiling point above 200° C. and being stable in the presence of water solutions of mineral acids the proportions of said liquid material to said solid material being from about one part of said liquid material to one part of said solid material to about twenty-five parts of said liquid material to one part of said solid material.

4. In a composition of matter in which a normally hard, solid material is dispersed in a material which is normally liquid to form a rubber-like resilient jel, in combination, material selected from the group consisting of polymerized vinyl chloride, polymerized vinyl acetate, and copolymers of vinyl chloride and vinyl acetate as the normally hard, solid material and a condensation reaction product of formaldehyde and pine oil as the normally liquid material, said normally liquid material having a boiling point above 200° C. and being stable in the presence of water solutions of mineral acids, said combination being in the state of a jel up to about 200° F.

5. An element adapted for use in the printing arts for transferring ink and comprising a resilient, rubber-like composition in which a co-polymeric vinyl chloride-vinyl acetate resin is in suspension in a normally liquid organic condensation reaction product of formaldehyde with material selected from the group consisting of turpentine, pine oil, pinene and terpineol the proportions of said reaction product to said resin being from about one part of said reaction product to one part of said resin to about ten parts of said reaction product to one part of said resin.

6. A printing roll comprising a resilient, rubber-like composition in which a co-polymeric vinyl chloride-vinyl acetate resin is in suspension in a normally liquid organic condensation reaction product of formaldehyde with material selected from the group consisting of turpentine, pine oil, pinene and terpineol, said composition being resilient and rubber like up to about 200° F.

7. An element adapted for use in the printing arts for transferring ink and comprising a resilient, rubber-like composition in which a vinyl resin, selected from the group consisting of polymerized vinyl chloride, polymerized vinyl acetate and copolymers of vinyl chloride and vinyl acetate, is in suspension in a normally liquid organic condensation reaction product of formaldehyde with material selected from the group consisting of turpentine, pine oil, pinene and terpineol the proportions of said reaction product to said resin being from about one part of said reaction product to one part of said resin to about ten parts of said reaction product to one part of said resin.

8. A printing roll comprising a resilient, rubber-like jel composition in which a copolymeric vinyl chloride-vinyl acetate resin is in suspension in a normally liquid organic condensation reaction product of formaldehyde with pine oil, said composition being in the state of a jel up to 200° F.

9. A printing roll comprising a resilient, rubber-like jel composition in which a copolymeric vinyl chloride-vinyl acetate resin is in suspension in a normally liquid organic condensation reaction product of formaldehyde with turpentine, said composition being in the state of a jel up to 200° F.

10. A composition of matter comprising a material selected from the group consisting of polymerized vinyl chloride, polymerized vinyl acetate and copolymers of vinyl chloride and vinyl acetate and a normally liquid organic condensation product selected from the group consisting of organic condensation reaction products of formaldehyde and turpentine, formaldehyde and pinene, formaldehyde and terpineol and formaldehyde and pine oil, said material being dissolved in said organic condensation product, said composition of matter being in the state of a gel up to about 200° F.

11. A composition of matter comprising a material selected from the group consisting of polymerized vinyl chloride, polymerized vinyl acetate and copolymers of vinyl chloride and vinyl acetate and a normally liquid organic condensation product of formaldehyde and turpentine, said material being dissolved in said organic condensation product, said composition of matter being in the state of a gel up to about 200° F.

12. A composition of matter comprising a material selected from the group consisting of polymerized vinyl chloride, polymerized vinyl acetate and copolymers of vinyl chloride and vinyl acetate and a normally liquid organic condensation product of formaldehyde and pine oil, said material being dissolved in said organic condensation product, said composition of matter being in the state of a gel up to about 200° F.

13. A composition of matter comprising a material selected from the group consisting of polymerized vinyl chloride, polymerized vinyl acetate and copolymers of vinyl chloride and vinyl acetate and a normally liquid organic condensation product of formaldehyde and pinene, said material being dissolved in said organic condensation product, said composition of matter being in the state of a gel up to about 200° F.

MORTIMER T. HARVEY.